United States Patent [19]

Kazama

[11] Patent Number: 5,703,840
[45] Date of Patent: Dec. 30, 1997

[54] MAGNETIC HEAD AND MAGNETO-OPTICAL RECORDING DEVICE

[75] Inventor: Tohio Kazama, Nagaoka, Japan

[73] Assignee: Alps Electric Co., Ltd., Tokyo, Japan

[21] Appl. No.: 770,608

[22] Filed: Dec. 19, 1996

Related U.S. Application Data

[63] Continuation of Ser. No. 418,309, Apr. 7, 1995, abandoned.

[30] Foreign Application Priority Data

Apr. 13, 1994 [JP] Japan .................................. 6-099337

[51] Int. Cl.$^6$ .......................... G11B 5/012; G11B 11/10
[52] U.S. Cl. ........................... 369/13; 360/59; 360/114; 360/110
[58] Field of Search ........................ 369/13; 360/103, 360/110, 114, 122, 59

[56] References Cited

U.S. PATENT DOCUMENTS 4,796,241  1/1989  Hayakawa et al. .................. 369/13
5,103,351  4/1992  Kazama et al. ..................... 360/59
5,239,425  8/1993  Kazama ........................... 360/59

FOREIGN PATENT DOCUMENTS

57-113406   7/1982  Japan ............................ 360/110
57-164459  10/1982  Japan ............................ 369/13

Primary Examiner—Stuart S. Levy
Assistant Examiner—William J. Klimowicz
Attorney, Agent, or Firm—Guy W. Shoup; Patrick T. Bever

[57] ABSTRACT

An E-shaped core is composed of a main core and side cores which are combined into one piece. A coil is wound around a bobbin which is inserted in the main core. A plate-shaped auxiliary core is connected to a sliding member. Connecting the E-shaped core and the auxiliary core completes the assembly of the magnetic head for a magneto-optical recording device. The auxiliary core surrounds the main core; therefore, the concentration of the magnetic flux at the end of the main core can be enhanced and the efficiency for generating magnetic field for a recording medium can be improved. In addition, the use of the E-shaped core and the plate-shaped auxiliary core permits easier machining of the cores.

11 Claims, 5 Drawing Sheets

MAGNETIC HEAD AND MAGNETO-OPTICAL RECORDING DEVICE

This application is a continuation of application Ser. No. 08/418,309, filed Apr. 7, 1995, now abandoned.

BACKGROUND OF THE INVENTION

1. Field of the Invention

The present invention relates to a magnetic head for a magneto-optical recording device, which magnetic head slides on a recording medium or floats slightly above and faces the recording medium on the opposite side from a beam irradiation side and, more particularly, to a magnetic head for a magneto-optical recording device which enables higher efficiency for generating a magnetic field to be applied to the recording medium and which also permits easier machining and assembly.

2. Description of the Related Art

A mini-disk unit, a magneto-optical memory unit, or the like employs a magneto-optical recording method based on magnetic field modulation which permits writing over recorded information.

Figure 9:
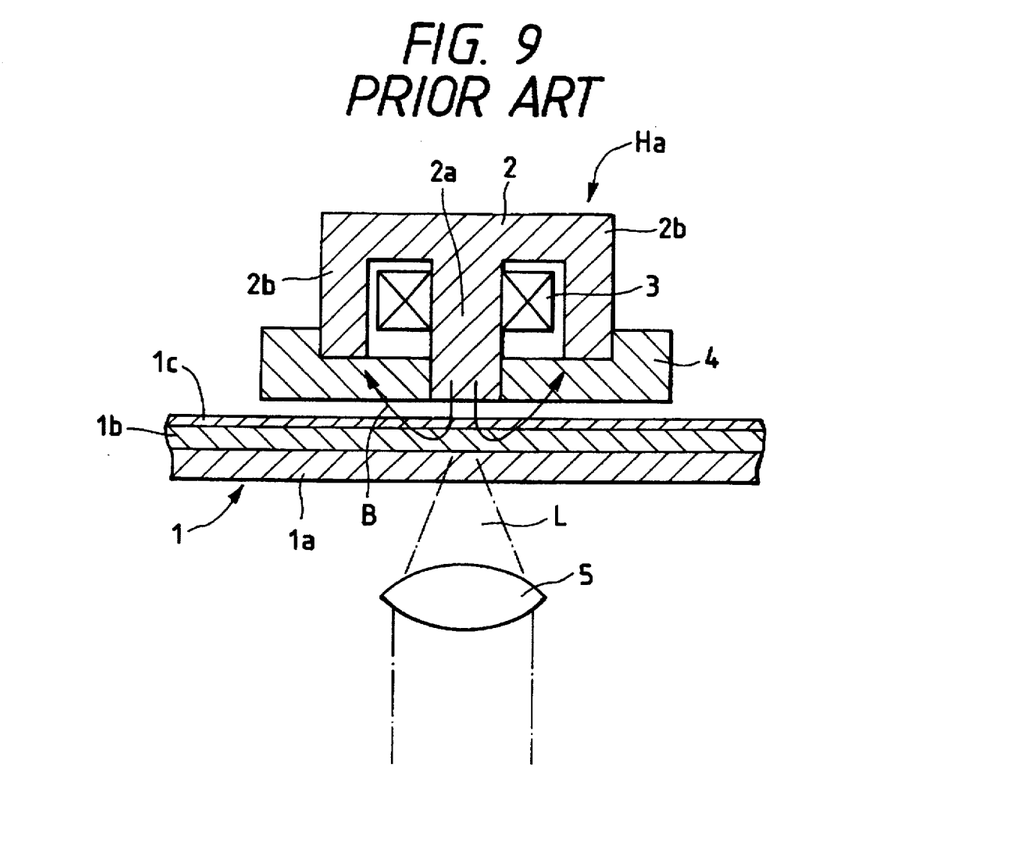
FIG. 9 is a cross-sectional view illustrative of a conventional magnetic head for a magneto-optical recording device.

FIG. 9 is a cross-sectional view of a magnetic head and a recording medium used in a conventional magneto-optical recording device based on magnetic field modulation. A recording medium 1 is, for example, a mini disk which has a vertical magnetization film 1b deposited on a light-transmitting substrate 1a, a protective film 1c being formed on the top surface of the vertical magnetization film 1b.

A magnetic head Ha has an E-shaped core 2. The E-shaped core 2 is constituted by a main core 2a serving as the central pole and side cores 2b, 2b located on both sides of the main core 2a, all the three components being combined into one piece. A coil 3 is wound around the main core 2a. Reference numeral 4 denotes a sliding member to which the aforesaid E-shaped core 2 is connected. The sliding member 4 is composed of a resinous material or other similar material which provides good slidability.

The rotation of the recording medium causes the sliding member 4 of the magnetic head Ha to slide on the surface of the protective film 1c of the recording medium 1. The substrate 1a of the recording medium 1 is provided with an optical head. Laser beam L is condensed through a condenser lens 5 of the optical head and radiated to the vertical magnetization film 1b. The condensed laser beam L heats a minute spot of the vertical magnetization film 1b. When the minute spot reaches a temperature of the Curie point or more, the vertical magnetic field given by the magnetic head Ha magnetizes the vertical magnetization film 1b to record information.

The conventional magnetic head Ha for a magneto-optical recording device shown in FIG. 9 employs the E-shaped core 2 which permits easy machining of the core. The coil 3 also permits easy installation on the main core 2a, leading to easy assembly. The distance, however, between the main core 2a and the side cores 2b, 2b unavoidably limits the density of magnetic flux B at the end of the main core 2a. This prevents effective magnetic field from being applied to the vertical magnetization film 1b at the minute spot which is heated by laser beam L, resulting in a limited efficiency for producing magnetic field for magneto-optical recording. Because of the limited efficiency, more turns of coil 3 are required to generate the modulated magnetic field necessary for magneto-optical recording and more power must be supplied to the coil 3. Increasing the number of turns of the coil 3 means a larger size of the whole magnetic head Ha.

Figure 10:
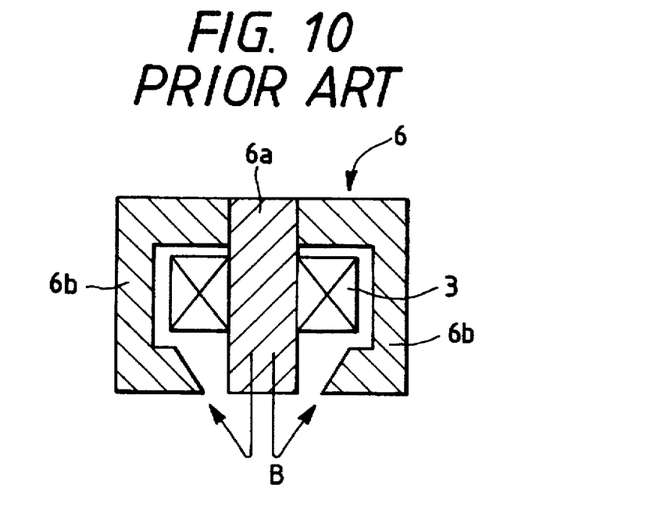
FIG. 10 is a cross-sectional view illustrative of a conventional magnetic head for a magneto-optical recording device.

FIG. 10 shows an example of a core shape for improved efficiency of generating magnetic field. A core 6 has C-shaped side cores 6b, 6b connected to both sides of an I-shaped main core 6a. The core 6 has magnetic gaps between the main core 6a and the side cores 6b, 6b; therefore, the density of magnetic flux B at the end of the main core 6a can be increased to effectively apply magnetic field to the vertical magnetization film 1b of the recording medium 1. The core 6 having the structure illustrated in FIG. 10 involves a complicated machining process and it does not permit the use of a bobbin to wrap the main core 6a with the coil 3, leading to difficult assembly.

SUMMARY OF THE INVENTION

The present invention has been made with a view toward solving the above problem and it is accordingly an object of the present invention to provide a magnetic head for a magneto-optical device which enables higher efficiency for generating magnetic field applied to the recording medium and which also permits easier assembly.

To this end, according to the present invention, there is provided a magnetic head for the magneto-optical device, which magnetic head is disposed on the opposite side from the beam irradiation side in relation to a recording medium; it is composed of a main core around which a coil is wound, side cores located on both sides of the main core, and an auxiliary core which is separate from the main core and the side cores and which forms a magnetic gap between itself and the aforesaid main core. The magnetic head is available in two types; in one type, it slides on a recording medium and in the other type, it floats slightly above the recording medium. The main core and the side cores can be formed into one piece in an E shape or a C shape. Alternatively, a discrete main core may be connected to the side cores.

The aforesaid auxiliary core should be of a plate with an opening so that the main core can be inserted in the opening, the ends of the side cores being connected to the auxiliary core. In the case of the magnetic head which slides on the recording medium, the auxiliary core is connected to the sliding member facing against the recording medium. In this case, it is possible to connect the auxiliary core to the sliding member made of resin or the like by bonding, fitting, press fitting, or insert molding. Further, the coil may be wound around the bobbin and the main core is inserted in the bobbin.

In the structure stated above, the auxiliary core which is separate from the main core and the side cores is provided and the magnetic gap is formed by the main core and the auxiliary core. This structure enables a shorter distance between the return path formed by the auxiliary core and the side cores and the main core, and it also allows the density of the magnetic flux at the tip of the main core to be increased, thereby enabling higher efficiency for generating the magnetic field to be applied to the recording medium. This consequently makes it possible to reduce the size of the magnetic head by decreasing the number of turns of the coil and to reduce the power consumed. The main core and the side cores can be formed into the E or C shape, ensuring simple machining of the cores.

Especially when the plate-shaped auxiliary core is used, the auxiliary core can be machined relatively easily by press molding or ultrasonic machining, thus preventing an increase in the machining cost of the whole core. Furthermore, when the structure, wherein the main core is inserted in the auxiliary core, is employed, the auxiliary core, which forms a part of the return path, is present in the whole outer peripheral area of the main core, thus making it possible to further enhance the efficiency for generating the vertical magnetic field applied to the recording medium.

In the case of the magnetic head which slides on the recording medium, the plate-shaped auxiliary core, which can be easily made by press molding or the like, can be readily made integral with the sliding member made of resin or the like by bonding, fitting, press fitting, or insert molding. Likewise, the main core and side cores can be shaped into the E- or C-shaped core; therefore, the cores and the coil can be readily assembled by inserting the bobbin wrapped with the coil in the main core. For instance, the bobbin is inserted in the main core beforehand and the auxiliary core shaped like a plate is combined with the sliding body into one piece beforehand. The whole magnetic head can be assembled with great ease by fixing the main core to the auxiliary core by bonding.

DESCRIPTION OF THE PREFERRED EMBODIMENTS

The following describes the embodiments of the present invention with reference to the accompanying drawings.

Figure 1:
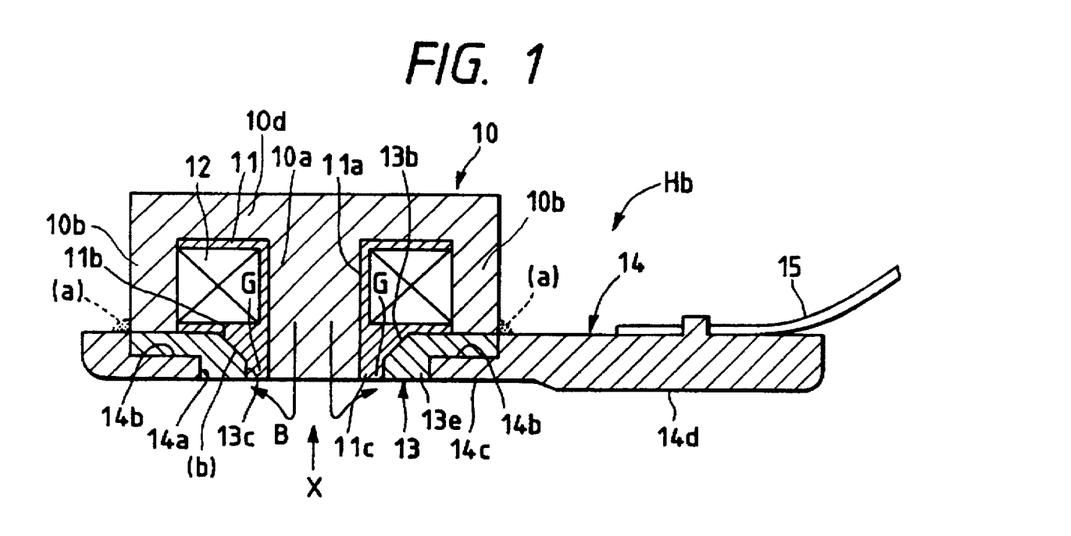
FIG. 1 is a cross-sectional view illustrative of a magnetic head for a magneto-optical recording device of a first embodiment in accordance with the present invention.
Figure 2:
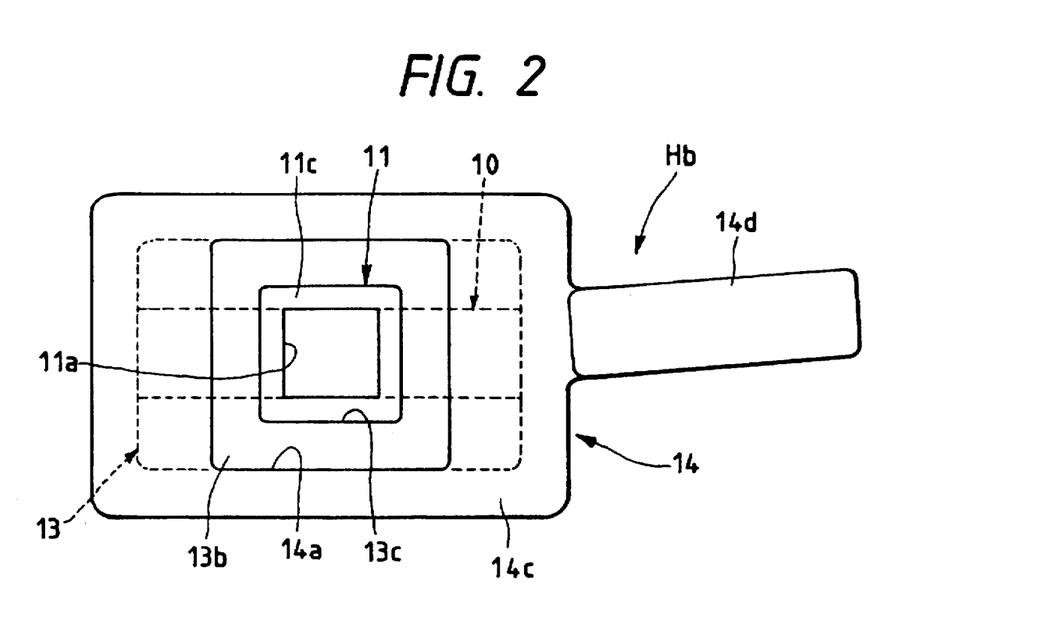
FIG. 2 is a bottom view observed from the direction indicated by arrow X in FIG. 1.
Figure 3:
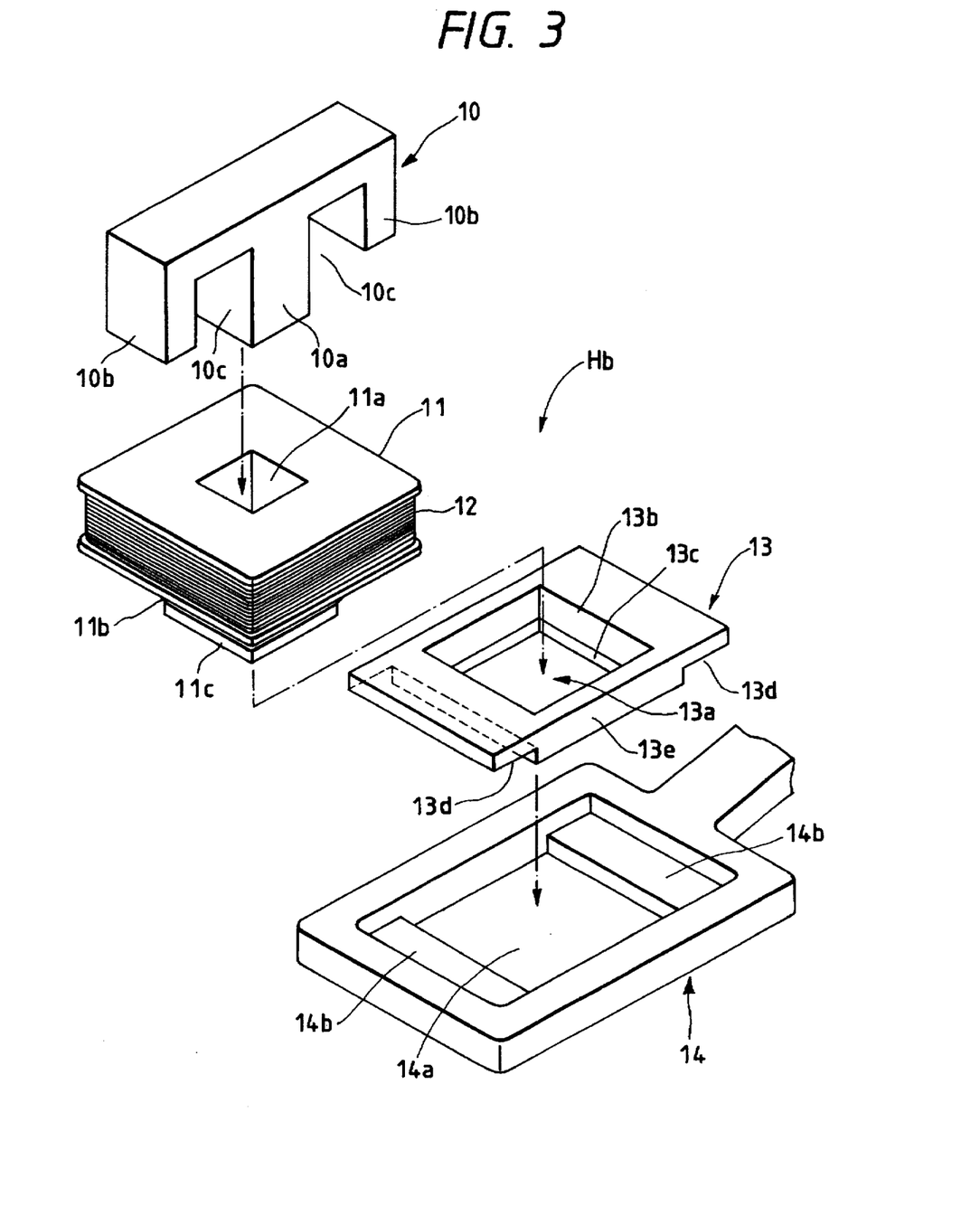
FIG. 3 is an exploded perspective view of the magnetic head for the magneto-optical recording device according to the first embodiment.

FIG. 1 is the cross-sectional view illustrative of the magnetic head for the magneto-optical recording device of the first embodiment in accordance with the present invention. FIG. 2 is the bottom view of FIG. 1 observed from the direction of arrow X. FIG. 3 is the exploded perspective view.

A sliding type magnetic head Hb according to the first embodiment slides on the protective film 1c (see FIG. 10) of the recording medium 1 such as a mini disk. An E-shaped core 10 is constituted by a main core 10a and side cores 10b, 10b which are integrally connected at fixed ends thereof to a base member 10d; it is made of a ferromagnetic material (e.g. Mn-Zn ferrite). The cross section of the main core 10a is nearly square; the cross section of the side cores 10b are rectangular.

Reference numeral 11 indicates a bobbin made of a nonmagnetic material such as resin, a coil 12 being wound around the bobbin 11. The bobbin 11 has a shaft opening 11a having a nearly square cross section, the main core 10a of the E-shaped core 10 being inserted in the shaft opening 11a. With the main core 10a inserted in the shaft opening 11a, the bobbin 11 is fitted, with almost no gap, in recessed sections 10c between the main core 10a and the side core 10b of the E-shaped core 10. A tapered surface 11b is formed on the bottom of the bobbin 11 and a square cylindrical section 11c is formed on the bottom of the tapered surface 11b.

An auxiliary core 13 is shaped like a plate; it is made of a ferromagnetic material such as Mn-Zn ferrite. The plate-shaped auxiliary core 13 in this embodiment can be produced by an easy machining means such as press molding. The auxiliary core 13 can alternatively be produced by ultrasonic machining or cutting. The auxiliary core 13 has an opening 13a which is located nearly at the center of the auxiliary core and which runs in the direction of the plate thickness. The upper half of the opening 13a is a tapered opening 13b which is in close contact with the tapered surface 11b of the bobbin 11 and the lower half thereof is a square opening 13c in which the outer periphery of the square cylindrical section 11c of the bobbin 11 is fitted. Formed on both longitudinal sides of the bottom surface of the auxiliary core 13 are stepped sections 13d, 13d with a smaller plate thickness.

Reference numeral 14 denotes the sliding member made of a resinous material such as nylon resin which allows of a smooth slide on the protective film 1c of the recording medium 1. The sliding member 14 may alternatively be made of a ceramic material. The sliding member 14 has a square opening 14a into which a bottom end section 13e of the auxiliary core 13 is fitted and stepped sections 14b, 14b onto which the stepped sections 13d, 13d of the auxiliary core 13 are fitted, which are all formed into one piece.

As illustrated in FIG. 1, the section of the bottom surface of the sliding member 14 where the square opening 14a is provided serves as a core opposing surface 14c in relation to the recording medium 1. The right section illustrated forms a sliding surface 14d which juts out from the core opposing surface 14c toward the recording medium. The surface opposite from the sliding surface 14d of the sliding member 14 is supported by a supporting member 15 made of a leaf spring material.

The assembly procedure for the aforesaid magnetic head Hb will now be described.

First, the main core 10a of the E-shaped core 10 is inserted in the shaft opening 11a of the bobbin 11 with the coil 12 wound around it, then the bobbin 11 is fitted in the recessed sections 10c, 10c of the E-shaped core 10. The bobbin 11 may be fixed to the E-shaped core 10 by bonding or simply by fitting without any bonding.

The auxiliary core 13 is fixed to the sliding member 14 in advance. The bottom end section 13e of the auxiliary core 13 is fitted in the square opening 14a of the sliding member 14 and the two members are fixed with an adhesive agent. Alternatively, the two members may be combined beforehand into one piece simply by press fitting or insert molding without using an adhesive agent.

In the next step, the E-shaped core 10 and the bobbin 11, which have been combined into one piece, and the auxiliary core 13 and the sliding member 14, which have been combined into one piece, are combined and bonded. To be more specific, the square cylindrical section 11c at the bottom end of the bobbin 11 is fitted into the square opening 13c of the auxiliary core 13, and the tapered surface 11b of the bobbin 11 is placed against the tapered opening 13b of the auxiliary core 13. At this time, an adhesive agent may be used for the connection between the bobbin 11 and the auxiliary core 13 to fix them. If, however, the E-shaped core 10 and the bobbin 11 are not bonded, then the E-shaped core 10 should be bonded to the auxiliary core 13. More specifically, rather than gluing the bobbin 11 and the auxiliary core 13 together, an adhesive agent is placed on the ends of the side cores 10b, 10b of the E-shaped core 10 and on the surface thereof against which the auxiliary core 13 is placed so as to bond and fix the two members. As an alternative, an adhesive agent may be applied to the portions indicated by (a) in FIG. 1 to bond and fix the E-shaped core 10 and the sliding member 14.

Thus, magnetic gap G is formed between the outer periphery of the main core 10 and the auxiliary core 13 and a part of the bobbin 11 serves as the magnetic gap material.

As it was discussed in reference to FIG. 10, magnetic head Hb in the embodiment described above is located on the protective film 1c side which is opposite from the beam irradiation side in relation to the recording medium 1. When the recording medium 1 rotates, the elastic force of the supporting member 15 causes the sliding surface 14d of the sliding member 14 to slide on the surface of the protective film 1c. The opposing surface 14c of the sliding member 14 faces the surface of the protective film 1c with a minute distance between them.

In magnetic head Hb, the auxiliary core 13 and the side cores 10b, 10b form a return path which lets magnetic flux B generated by the main core 10a flow from the end of the main core 10a to the auxiliary core 13. As shown in FIG. 1, the small distance between the end of the main core 10a and the square opening 13c of the auxiliary core 13 makes it possible to concentrate magnetic flux B at the end of the main core 10a. The magnetic field applied to the minute spot of the vertical magnetization film 1b which is heated by laser beam L can be intensified by increasing the density of the magnetic flux at the end of the main core 10a, thereby achieving higher efficiency for generating magnetic field in magnetic modulation recording.

The concentration of magnetic flux B can be enhanced at the end of the main core 10a and therefore the efficiency for generating magnetic field can further be increased by inserting the main core 10a in the opening 13a of the auxiliary core 13 so that the core 13 equidistantly surrounds the outer periphery of the end of the main core 10a as illustrated in FIG. 2 and FIG. 3 in particular. Furthermore, the tapered opening 13b, which forms the upper half of the opening 13a of the auxiliary core 13, makes it difficult for the magnetic flux to short-circuit from the main core 10a to the auxiliary core 13 at a portion indicated by (b) in FIG. 1. Decreasing the chance of such short circuit also makes it easier to concentrate magnetic flux B at the front of the main core 10a, thus improving the efficiency for generating the magnetic field for magnetizing the vertical magnetization film 1b.

Figure 4:
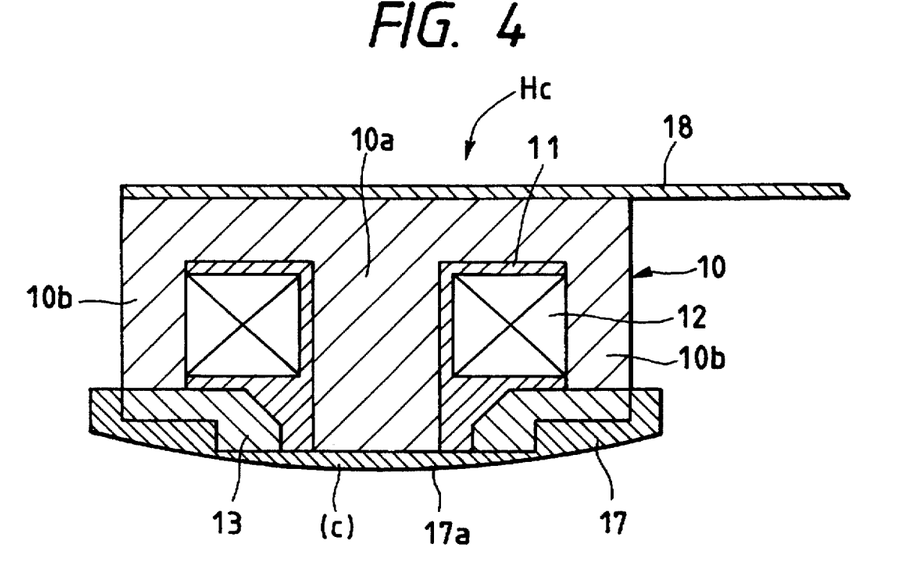
FIG. 4 is a cross-sectional view of the magnetic head for the magneto-optical recording device, showing a modification of the first embodiment.

FIG. 4 shows the modification of the first embodiment described above.

In magnetic head Hc shown in FIG. 4, the shapes of the E-shaped core 10, the bobbin 11, the coil 12, and the auxiliary core 13 are the same as those shown in FIG. 1 to FIG. 3. The auxiliary core 13 is made integral with a sliding member 17. The sliding member 17 is made of a nylon resin material as in the case of the sliding member 14 illustrated in FIG. 1. The sliding member 17 and the auxiliary core 13 are combined into one piece by bonding, press fitting, fitting, or insert molding. As it was discussed in the first embodiment above, the E-shaped core 10 and the bobbin 11 are preassembled and this preassembled unit is connected to the auxiliary core 13 and the sliding member 17 which are combined into one piece, then they are bonded with the adhesive agent which is applied, for example, on the ends of the side cores 10b, 10b and on the connection with the auxiliary core 13.

In the modification illustrated in FIG. 4, the end of the main core 10a is covered by a part of the sliding member 17 made of a resinous material. A surface 17a of the sliding member 17 at the front of the main core 10a slides on the surface of the protective film 1c of the recording medium 1. Reference numeral 18 denotes a gimbal which supports magnetic head Hc.

The concentrated magnetic flux at the end of the main core 10a in the modification shown in FIG. 4 is the same as that in the embodiment illustrated in FIG. 1 and FIG. 2.

Figure 5:
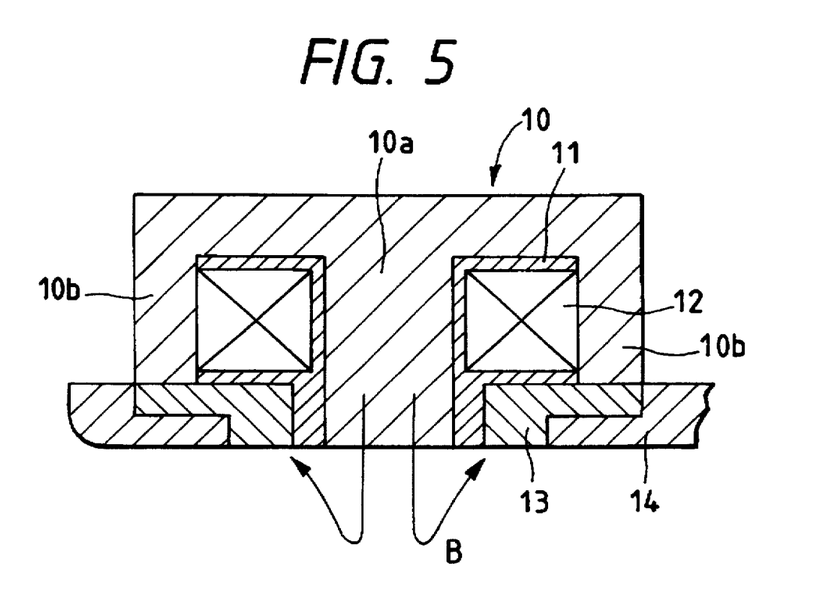
FIG. 5 is a cross-sectional view of the magnetic head for the magneto-optical recording device, showing another modification.
Figure 6:
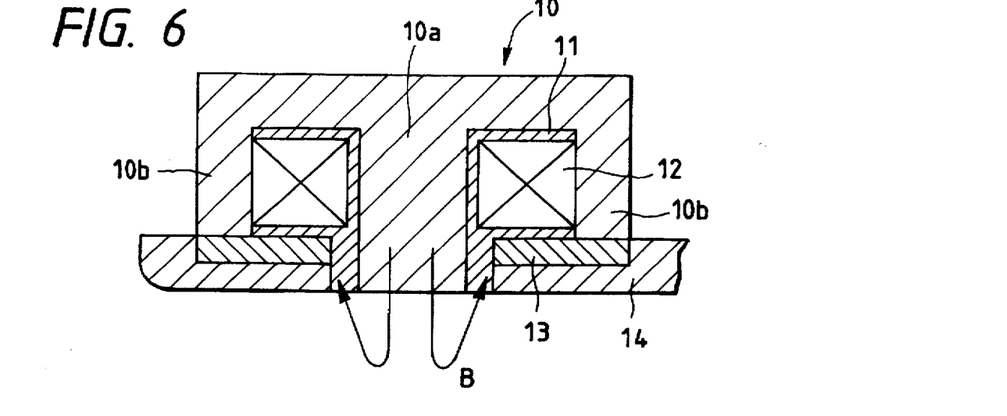
FIG. 6 is a cross-sectional view of the magnetic head for the magneto-optical recording device, showing still another modification.

FIG. 5 and FIG. 6 show another modification of the embodiment shown in FIG. 1 to FIG. 3.

In the modification shown in FIG. 5, the auxiliary core 13 does not have the tapered opening 13b; the opening 13a forms the square opening which runs in the direction of the plate thickness of the auxiliary core 13. Likewise, the bobbin 11 does not have the tapered surface 11b.

In the modification shown in FIG. 6, the auxiliary core 13 is made of a thin flat plate which does not have the tapered opening 13b or the stepped sections 13d, 13d. The bottom surface of the auxiliary core 13 is covered with the sliding member 14.

The modification shown in FIG. 5 does not have the tapered opening in the auxiliary core 13 and also the tapered surface 11b of the bobbin 11, allowing easier machining of the auxiliary core 13 and the like as compared with the embodiment shown in FIG. 1. Likewise, the auxiliary core 13 uses a thin flat plate free of any steps in the modification shown in FIG. 6, allowing the auxiliary core 13 to be mass-produced by press molding or the like. This advantage leads to reduced cost.

The absence of the tapered opening 13b in the auxiliary core 13 of the modification illustrated in FIG. 5 provides slightly lower concentration of the magnetic flux at the end of the main core 10a than that shown in FIG. 1. On the other hand, however, the auxiliary core 13 surrounding the main core 10a significantly improves the efficiency for generating magnetic field over the conventional type shown in FIG. 10.

In the modification shown in FIG. 6, the bottom surface of the auxiliary core 13 is covered with the sliding member 14; therefore, the concentration of the magnetic flux at the end of the main core 10a is not as good as that of the type shown in FIG. 1 or FIG. 5. On the other hand, however, the efficiency for generating the magnetic field can be greatly improved over that obtained by the conventional type shown in FIG. 10. In addition, the extremely easy production of the auxiliary core 13 makes it ideally suited for mass production.

Figure 7:
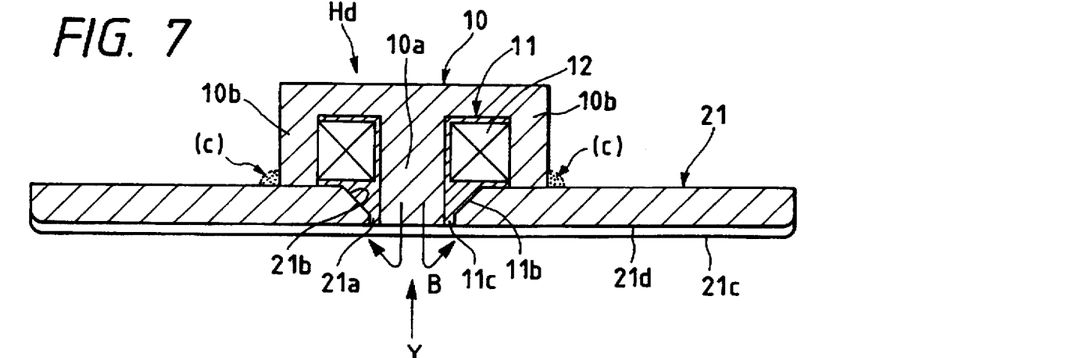
FIG. 7 is a cross-sectional view illustrative of the magnetic head for the magneto-optical recording device in accordance with a second embodiment.
Figure 8:
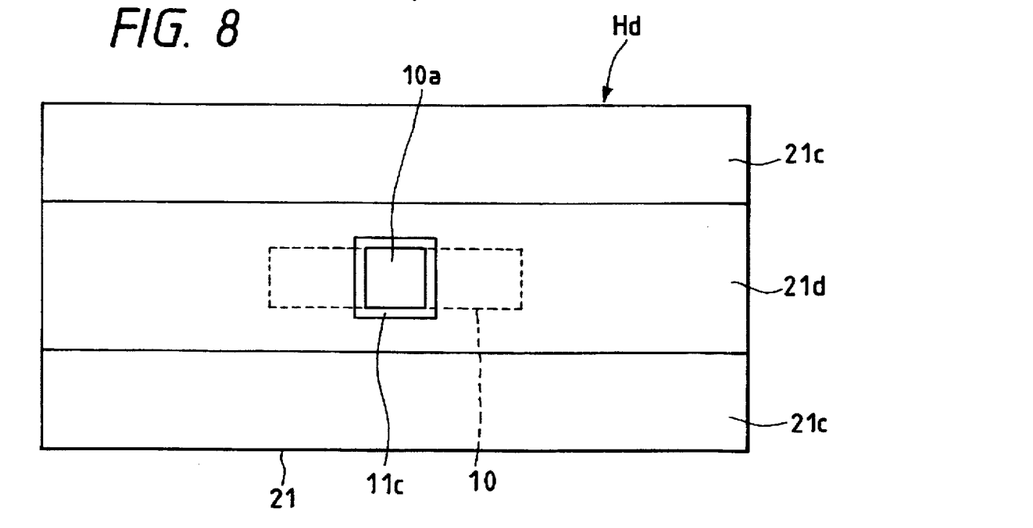
FIG. 8 is a bottom view observed from the direction indicated by arrow Y in FIG. 7.

FIG. 7 is the cross-sectional view illustrative of the magnetic head for the magneto-optical recording device according to the second embodiment of the present invention. FIG. 8 is the bottom view observed from the direction indicated by arrow Y shown in FIG. 7.

The second embodiment shows magnetic head Hd which floats slightly above the recording medium 1 due to an air stream on the surface of the protective film 1c of the recording medium 1 which rotates in a magneto-optical memory device. In the second embodiment, the E-shaped core 10, the bobbin 11, and the coil 12 have the same shapes as those of the embodiment shown in FIG. 1 to FIG. 3. An auxiliary core 21 of the second embodiment, however, serves as a slider for floating. The auxiliary core 21 is composed of a ferromagnetic material such as Mn-Zn ferrite as in the case of the aforesaid auxiliary core 13. A square opening 21a and a tapered opening 21b are provided nearly at the center of the auxiliary core 21. The tapered surface 11b and the square cylindrical section 11c of the bobbin 11 are fitted in the tapered opening 21b and the square opening 21a in close contact. The E-shaped core 10 and the auxiliary core 21 are mutually bonded and fixed with an adhesive agent applied in the positions indicated by (c).

As shown in FIG. 8, rail surfaces (ABS surfaces) 21c, 21c are formed on the right and left sides on the bottom surface of the auxiliary core 21, with a shallow groove 21d formed at the center. The end of the main core 10a is exposed in the groove 21d. The rail surfaces 21c, 21c and the groove 21d of the auxiliary core 21 face the surface of the protective film 1c of the recording medium 1. The air stream produced by the movement of the recording medium 1 causes the auxiliary core 21 to float slightly above the protective film 1c. Magnetic flux B extending toward the front of the main core 10a magnetizes the vertical magnetization film 1b.

The auxiliary core 21 is lightly pressed by the recording medium through a supporting member such as a leaf spring, which is not illustrated, and the auxiliary core 21 floats against the pressing force. In this embodiment, magnetic flux B from the main core 10a is led by the auxiliary core 21 which also serves as the slider. The concentrating function for magnetic flux B at the end of the main core 10a is the same as that of the first embodiment shown in FIG. 1.

In the embodiment shown in FIG. 7 and FIG. 8, the end of the main core 10a is exposed in the groove 21d of the auxiliary core 21. The end of the main core 10a, however, may alternatively be exposed onto the rail surface 21c. Likewise, although the E-shaped core 10 is used in the embodiments described above, the C-shaped core may be used in place of the E-shaped core 10. Furthermore, the auxiliary core 13 is not limited to the type which encloses the end of the main core 10a; it may be formed so that it is divided into two separate parts which are connected separately to the bottom ends of the side cores 10b, 10b of the E-shaped core 10 shown in FIG. 3.

Thus, according to the present invention, the distance between the return path formed by the auxiliary core and the side cores and the main core can be shortened to increase the density of the magnetic flux at the end of the main core, thus enabling higher efficiency for generating the magnetic field to be applied to the recording medium. This makes it possible to decrease the number of turns of the coil to achieve a smaller magnetic head and to reduce the power consumed. In addition, since the main core and the side cores can be formed into the E-shaped or C-shaped core, easier core machining is possible.

The use of the plate-shaped auxiliary core permits relatively easy machining of the auxiliary core by press molding or the like, thus causing no increase in the machining cost of the completed core. When the structure, wherein the main core is inserted in the opening of the auxiliary core, is employed, the auxiliary core is present over the entire outer peripheral area of the main core, making it possible to further enhance the efficiency for generating the vertical magnetic field to be applied to the recording medium.

In the case of the magnetic head which slides on the recording medium, the auxiliary core can be readily combined with the sliding member made of resin or the like into one piece by gluing, fitting, press fitting, or insert molding. Moreover, since the main core and the side cores can be formed into the E-shaped or C-shaped core, the core and the coil can be easily assembled by inserting the bobbin wrapped with the coil in the main core.

What is claimed is:

1. A magnetic head for a magneto-optical recording device in which the magnetic head is disposed adjacent a surface of a recording medium, said magnetic head comprising:

a magnetic core formed from a first integral piece of magnetic material, the magnetic core including:
an elongated base member;
a main core portion extending perpendicular to the base member, the main core portion having a fixed end fixedly connected to the base member, and a free end located further from the base member than the fixed end; and
a side core portion extending perpendicular to the base member and parallel to the main core portion, the side core portion having a fixed end fixedly connected to the base member and a free end located further from the base member than the fixed end, the free end of the side core portion being spaced a first distance from said main core portion;

a coil wound around the main core portion such that a portion of the coil is located between the main core portion and the side core portion; and an auxiliary core formed from a second integral piece of magnetic material which is separate from said first integral piece, the auxiliary core contacting the free end of the side core portion and having a central portion extending from the side core portion toward the main core portion, the central portion defining an opening having an edge which is spaced a second distance from the free end of the main core portion such that a magnetic gap is formed between the edge and the free end of said main core portion;

wherein the first distance is greater than the second distance such that magnetic flux generated by the main core portion flows from the free end of the main core portion across the magnetic gap and along a return path formed by the auxiliary core and the side core portion.

2. A magnetic head for the magneto-optical recording device according to claim 1, wherein said auxiliary core is composed of a plate defining said opening and the free end of said main core portion is inserted in said opening.

3. A magnetic head for the magneto-optical recording device according to claim 2, wherein said auxiliary core is connected to a sliding member which faces the surface of said recording medium.

4. A magnetic head for the magneto-optical recording device according to claim 3, wherein said coil is wound around a bobbin, said bobbin being mounted over said main core portion, and wherein a portion of the bobbin is located between the free end of the main core portion and the edge of the central portion of the auxiliary core.

5. A magnetic head for the magneto-optical recording device according to claim 3, wherein said sliding member is connected to the free end of said main core portion which faces said recording medium.

6. A magnetic head for the magneto-optical recording device according to claim 3, wherein said sliding member is provided on a surface of said auxiliary core which faces said recording medium.

7. A magnetic head for the magneto-optical recording device according to claim 2, wherein first and second rail surfaces are provided on a surface of said auxiliary core which faces said recording medium such that a groove is provided between the first and second rail surfaces.

8. A magneto-optical recording device for reading information from and recording information to a recording medium, the magneto-optical recording device comprising an E-shaped magnetic head including:

a magnetic core formed from a first integral piece of magnetic material, the magnetic core including:
an elongated base member having a center located between a first end and a second end;
a main core portion extending perpendicular to the base member, the main core portion having a fixed end located at an intersection of the main core portion and the base member and located adjacent the center of the base member, the main core portion having a free end spaced away from the base member;
a first side core portion extending perpendicular to the base member and parallel to the main core portion, the first side core portion having a fixed end located at an intersection of the first side core portion and the base member near the first end, and a free end spaced away from the base member, the free end of the first side core portion being spaced a first distance from said main core portion; and
a second side core portion extending perpendicular to the base member and parallel to the main core portion, the second side core portion having a fixed end located at an intersection of the second side core portion and the base member near the second end, and
a free end spaced away from the base member, the free end of the second side core portion being spaced a second distance from said main core portion, the second distance being substantially equal to the first distance;

a coil wound around the main core portion such that a first portion of the coil is located between the main core portion and the first side core portion, and a second portion of the coil is located between the main core portion and the second side core portion;

an auxiliary core formed from a second integral piece of magnetic material, the auxiliary core contacting the free ends of the first and second side core portions and having central portions respectively extending from the first and second side core portions toward the main core portion, the central portions defining an opening having an edge which is spaced a third distance from the free end of the main core portion such that a magnetic gap is formed between the edge and the free end of said main core portion;

wherein the first distance is greater than the third distance such that magnetic flux generated by the main core portion flows from the free end of the main core portion across the magnetic gap and along return paths formed by the auxiliary core and the first and second side core portions.

9. A magnetic head for the magneto-optical recording device according to claim 8,
wherein said auxiliary core is a plate defining the opening,
wherein said coil is wound around a bobbin, said bobbin being mounted over said main core portion, and
wherein a wall of the bobbin is located between the edge of the opening and the free end of the main core portion.

10. A magnetic head for the magneto-optical recording device according to claim 9, wherein said auxiliary core is connected to a sliding member.

11. A magnetic head for the magneto-optical recording device according to claim 9, wherein first and second rail surfaces are provided on a surface of said auxiliary core which faces said recording medium such that a groove is provided between the first and second rail surfaces.

* * * * *